United States Patent
Laubry

(10) Patent No.: US 8,168,281 B2
(45) Date of Patent: May 1, 2012

(54) POLYUREA ADHESIVE

(75) Inventor: Philippe Laubry, Charbonnieres-les-Varennes (FR)

(73) Assignee: Michelin Rechenche er Technique, S.A. (CH)

(*) Notice: Subject to any disclaimer, the term of this patent is extended or adjusted under 35 U.S.C. 154(b) by 394 days.

(21) Appl. No.: 12/439,293

(22) PCT Filed: Oct. 27, 2006

(86) PCT No.: PCT/US2006/042252
§ 371 (c)(1),
(2), (4) Date: Feb. 27, 2009

(87) PCT Pub. No.: WO2008/051229
PCT Pub. Date: May 2, 2008

(65) Prior Publication Data
US 2010/0021676 A1    Jan. 28, 2010

(51) Int. Cl.
*B32B 5/02* (2006.01)
*B32B 25/08* (2006.01)
*B32B 37/12* (2006.01)
*B29C 73/00* (2006.01)
*C09J 175/02* (2006.01)

(52) U.S. Cl. ...... 428/63; 428/423.9; 156/97; 156/331.7; 442/327

(58) Field of Classification Search .................. None
See application file for complete search history.

(56) References Cited

U.S. PATENT DOCUMENTS

| | | | |
|---|---|---|---|
| 3,773,695 A * | 11/1973 | Argabright et al. | 521/161 |
| 3,872,049 A | 3/1975 | Farah et al. | |
| 4,001,290 A * | 1/1977 | Wagner et al. | 560/336 |
| 4,046,743 A | 9/1977 | Schonfeld | |
| 5,086,152 A * | 2/1992 | Iwamoto | 528/55 |
| 5,126,423 A * | 6/1992 | Iwamoto | 528/45 |
| 5,159,048 A * | 10/1992 | Cassidy et al. | 528/53 |
| 5,162,481 A | 11/1992 | Reid et al. | |
| 5,169,878 A * | 12/1992 | Chen et al. | 521/161 |
| 5,183,877 A | 2/1993 | Swanson | |
| 5,288,766 A * | 2/1994 | Narayan et al. | 521/128 |
| 5,354,609 A | 10/1994 | Wang | |
| 5,654,085 A | 8/1997 | Markusch et al. | |
| 6,624,283 B2 | 9/2003 | Viegas et al. | |
| 6,797,789 B2 | 9/2004 | Davis et al. | |
| 2002/0091222 A1 | 7/2002 | Viegas et al. | |
| 2007/0066786 A1 * | 3/2007 | Hanson et al. | 528/44 |

FOREIGN PATENT DOCUMENTS

| | | |
|---|---|---|
| EP | 0316666 | 5/1989 |
| EP | 0547 379 A2 | 6/1993 |

OTHER PUBLICATIONS

International Search Report and Written Opinion for PCT/US06/42252, dated Mar. 15, 2007.

* cited by examiner

*Primary Examiner* — John J Figueroa
(74) *Attorney, Agent, or Firm* — Frank J. Campigotto

(57) ABSTRACT

A polyurea adhesive composition that is obtainable by reaction of reaction components that include a polyisocyanate comprising isocyanurate rings, the polyisocyanate having a functionality equal to or greater than 3, a polyamine having an average molecular weight greater than about 500 dalton and a carboxylic acid. Additionally, the reaction components may comprise an aromatic diamine chain extender. The molar ratio of the isocyanate groups to whole amine and carboxylic acid functions of the reaction components is between 1.5 and 3.5. Further provided is an article comprising a component bonded to the article with the polyurea adhesive described above. The bonded faces between the component and the article may be of cross-linked rubber composition. The article may be, for example, a tire, a tread band and/or a patch applied to the tire.

22 Claims, No Drawings

POLYUREA ADHESIVE

BACKGROUND OF THE INVENTION

1. Field of the Invention

This invention relates generally to adhesives and more specifically, to polyurea adhesives.

2. Description of the Related Art

Various adhesive products are commercially available for use as sealants or adhesives to repair or patch polymeric elastomeric materials such as, for example, natural rubber, synthetic rubber, plasticized polyvinyl chloride, polychloroprene and the like.

Polyureas are obtained by the polyaddition of substantially equivalent amounts of polyisocyanates and polyamines (especially diamines) having terminal amino groups. Typically, polyureas are rigid compositions upon curing and are typically used for injection molding of automotive parts, where fast cure and short cycle times are desired, and for molding rigid articles, such as skate wheels and ski boots.

It is known to use polyureas in an adhesive. For example, U.S. Pat. No. 5,183,877 discloses a polymeric adhesive that is produced by reacting a polyurea prepolymer with a binary blend consisting of a particular polyether amine and of a chain extender consisting of an aromatic diamine.

U.S. Pat. No. 6,624,283 discloses an adhesive based on a copolymer comprising urea or urethane and isocyanurate groups. The adhesive was disclosed as being useful for tire retreading as well as other industrial applications such as, for example, the bonding of elastomeric shoes soles.

SUMMARY OF THE INVENTION

Particular embodiments of the present invention include a polyurea adhesive composition that is obtainable by reaction of reaction components. The reaction components include a polyisocyanate comprising isocyanurate rings, the polyisocyanate having a functionality equal to or greater than 3, a polyamine having an average molecular weight greater than about 500 dalton and a carboxylic acid. Additionally, the reaction components may comprise an aromatic diamine chain extender. The molar ratio of the isocyanate groups to whole amine and carboxylic acid functions of the reaction components is between 1.5 and 3.5.

In particular embodiments, the polyisocyanate may be a trimer derived from hexamethylene diisocyanate having functionality equal to 3 and the carboxylic acid may be selected from fatty acids, rosin acids or mixtures thereof.

Particular embodiments of the present invention further provide a process having steps that include reacting the following reaction components in mass fraction relative to the total mass of reactants to form a polyurea adhesive:

between 40 and 70% of a polyisocyanate comprising isocyanurate rings, the polyisocyanate having a functionality equal to or greater than 3;

between 10 and 40% of a polyamine having an average molecular weight greater than about 500 dalton;

between 5 and 25% of a carboxylic acid; and between 0 and 20% of an aromatic diamine chain extender.

Particular embodiments of a method of the present invention may further include the steps of applying the polyurea adhesive to a face of a cross-linked rubber article and bonding the face of the cross-linked rubber article to a substrate.

Particular embodiments of the present invention further provide an article comprising a component bonded to the article with the polyurea adhesive described above. The bonded faces between the component and the article may be of cross-linked rubber composition. The article may be, for example, a tire, a tread band and/or a patch applied to the tire.

The foregoing and other objects, features and advantages of the invention will be apparent from the following more particular description of particular exemplary embodiments of the invention.

DETAILED DESCRIPTION OF PREFERRED EMBODIMENTS

The present invention provides polyurea adhesives, methods for their use and for their making and articles that include the adhesive as a bonding material. The polyurea adhesives of the present invention are particularly well suited for use to bond elastomers, especially those that are cross-linked rubber compositions. Surprisingly it has been discovered that by including carboxylic acid as one of the polyurea adhesive's reactants, the bonding strength of the adhesive is substantially increased over similar adhesives that do not use carboxylic acid as a reactant. Advantageously, the pot life, or the time limit for use of the adhesive before it becomes too viscous to spread, is quite short. As a guide, the pot life is between about 1.5 and 4 minutes at ambient conditions.

As is known, a polyurea is a product of the reaction between an isocyanate and an amine. The polyurea adhesives of the present invention include, as a reaction component that forms the polyurea adhesive, polyisocyanates having isocyanurate rings. These rings provide the adhesive with thermal stability at temperatures above 100° C. The resulting thermal stability of the polyurea adhesive having the isocyanurate rings makes the adhesive particularly useful for use in tires, such as bonding a tread to a tire carcass or bonding a patch to a tire.

Particular embodiments of the present invention include, as a reaction component of the polyurea adhesives, polyisocyanates with a low viscosity at ambient temperature and having a viscosity, measured according to the Brookfield technique, of between 8 and 16 poise. The polyisocyanates may be aliphatic or aromatic and in particular embodiments, the polyisocyanates may be dimers or trimers. In one embodiment, the polyisocyanate having isocyanurate groups is derived from hexamethylene diisocyanate having a functionality that is equal to or greater than three. In this example, the hexamethylene diisocyanates are attached around the isocyanurate ring.

In addition to the polyisocyanates, particular embodiments of the polyurea adhesives further include as reaction components a polyamine having an average molecular weight that is greater than about 500 dalton or in other embodiments, greater than about 950 dalton. The polyamine is intended to react with the polyisocyanate to obtain the urea groups that make up a part of the polyurea adhesive. Particularly useful as the polyamine reactants are oligomeric diamines.

Polyether diamines are useful as the polyamine. Examples include a polyoxypropylene diamine, a polyoxyethylene diamine and, preferably, a polyoxytetramethylene diamine, such as polyoxytetramethylene bis(p-aminobenzoate). Particular embodiments of the present invention may include as the polyamine, for example, other polyether diamines such as a polyether comprising an aliphatic amine group at each chain end, such as a polypropylene glycol diamine or a polytetrahydrofuran diamine (obtained by reacting 4-aminobenzoic acid with polytetrahydrofuran, and having a molecular mass ranging between 650 and 2000 g/mol).

Carboxylic acid used as a reactant to form the polyurea adhesives provides the surprising result of significantly increasing the bond strength of the polyurea adhesive. Useful carboxylic acids as reactants to form the polyurea adhesive include, for example, fatty acids, rosin acids and mixtures of these acids. Particular embodiments of the present invention utilize distilled tall oil as the carboxylic acid reactant component. Certain distilled tall oils contain carboxylic acid mixtures that include oleic acid, linoleic acid, abietic acid and dehydroabietic acid. A suitable tall oil product useful in particular embodiments of the present invention can be obtained from Arizona Chemicals, Inc. as SYLVATAL D40LR.

Particular embodiments of the present invention may further include a chain extender and in some embodiments, an aromatic chain extender as reactant components of the polyurea adhesive. Non-limiting examples of chain extenders include a mixture of 2,4 and 2,6 isomers of DETDA (diethyltoluenediamine), piperazine or DEDA (diethylenediamine), MEA (monoethanolamine), methylenebis(N,N-dibutyldianiline), IPDA (isophoronediamine), or a mixture of 3,5-dimethylthio-2,4-toluenediamine and -2,6-toluenediamine isomers.

Trimerization catalysts may be used as a reaction component to form particular embodiments of the polyurea adhesives. Such catalysts include tertiary amines that allow the catalysis of the reactions for forming isocyanurates. Such catalysts include DMEA (dimethylethanolamine), TMBDA (tetramethylbutanediamine), alkylamino ethers (for example bis(dimethylaminoethyl)ether), piperazines such as piperidine, tertiary alkylamines such as 3dialkylaminopropionamides, TEA (triethylamine), N,N-dialkyl-3-(dialkylamino)propylamine, substituted morpholines such as N-acetamidopropylmorpholine, tris(dimethylamino)phenol and tris(dimethylaminomethyl)phenol, or metal salts such as dibutyltin dilaurate. Advantageously, tris(dimethylaminomethyl)phenol or dibutyltin dilaurate may be used.

Particular embodiments of the present invention also include methods for making the polyurea adhesives. A particular embodiment includes reacting the polyisocyanate comprising isocyanurate rings with the polyamine, the chain extender and the carboxylic acid in the following amounts (expressed as weight percent of the total mass of reactant components):
  a) between 40 and 70% of the polyisocyanate or alternatively, between about 50 and 65%;
  b) between 10 and 40% of the polyamine or alternatively, between about 15 and 30%;
  c) between 0 and 2% of the trimerization catalyst or alternatively, between about 0.5 and 1.5%;
  d) between 0 and 20% of the chain extender or alternatively, between about 5 and 15%; and
  e) between 5 and 25% of the carboxylic acid or alternatively, between about 10 and 25%.

Advantageously, particular embodiments of the method for making the polyurea adhesives do not include a solvent. Furthermore, with the addition of the carboxylic acid as a reactant, the percent of the chain extender used as the reaction components can be decreased, providing a more flexible adhesive with excellent bonding properties. While not limiting the invention, it is thought that when the carboxylic acids statistically react with the isocyanates, the carboxylic acids cause the network to pass from a mainly three dimensional state towards a rather two dimensional state. The two dimensional state is more favorable for a better segregation of hard segments, which improves, inter alia, thermal stability.

It should be noted that particular embodiments of the present invention provide an excess of the polyisocyanate as a reactant. Such provision makes it possible to compensate for the subsequent losses of this reactant as a result of the humidity in ambient air and of the rubber surfaces with which the polyurea adhesive obtained contacts for bonding purposes and of migration of products originating from the bonding surfaces. Furthermore, the excess of polyisocyanate gives the polyurea adhesive obtained satisfactory resistance to the subsequent aminolysis reaction of the urea groups.

The method further includes mixing the reaction components as a two-part adhesive. The first part, Part A, may include, for example, the polyamine, the chain extender, the carboxylic acid and the trimerization catalyst. The second part, Part B, includes the polyisocyanate.

Particular embodiments of the present invention that includes methods of making the polyurea adhesive further includes combining the polyisocyanate with a blend comprising the polyamine, the trimerization catalyst and the chain extender, wherein the blend has a viscosity, measured according to the Brookfield technique, of between 38 and 46 poise. It will be noted that the low viscosities for the polyisocyanate and for the blend give a liquid state at ambient temperature, thereby making the polyurea adhesive thus obtained easier to use at ambient temperature.

Particular embodiments of the present invention further include articles having bonded faces using the polyurea adhesive. For example, a tire carcass may have a tread band bonded to its surface using the polyurea adhesive as the bonding adhesive. Such a procedure may be used for either a new tire or to provide a retreaded tire with the tread band prepared from a cross-linked rubber composition for the purpose of retreading, wherein the tread band comprises the adhesive of the invention on its radially internal face and the tread molded into its radially external face.

An article according to particular embodiments of the invention comprises two parts that are bonded together at two of their respective faces by means of the polyurea adhesive, wherein at least one of the faces comprises a cross-linked rubber composition. The adhesive is preferably applied to each of these two parts, for example using a brush or a spray gun.

The bonding by the adhesive is advantageously carried out at ambient temperature, i.e., between about 20° C. and 40° C., by exerting on the two parts to be bonded a pressure that may range between about 0.03 bar and 5 bar, the duration of the exertion being proportionately shorter at higher pressures.

It is noted that, in the case of a pressure of 0.03 bar, this pressure must be exerted immediately after applying the adhesive, whereas in the case of a pressure greater than or equal to about 2 bar, the pressure can effectively be exerted at any time before the adhesive has gelled.

It will also be noted that a "maturation" time is required for the assembly in the bonded state, in order for the bonding activity of the adhesive to be ensured. This maturation time is at least 48 hours at ambient temperature, or a few hours at a temperature of between 60° C. and 100° C.

According to a particular embodiment of the present invention, each of the two faces that are bonded together with the polyurea adhesive is made from a cross-linked rubber composition, in particular a composition comprising predominantly at least one diene elastomer.

The term "diene elastomer" means an elastomer derived at least in part (i.e., a homopolymer or a copolymer) from diene monomers (monomers bearing two conjugated or unconjugated carbon-carbon double bonds), in particular:
  any homopolymer obtained by polymerization of a conjugated diene monomer containing from 4 to 12 carbon atoms;
  any copolymer obtained by copolymerization of one or more dienes, conjugated together or with one or more vinyl aromatic compounds containing from 8 to 20 carbon atoms;

a ternary copolymer obtained by copolymerization of ethylene or of an alpha-olefin containing 3 to 6 carbon atoms with an unconjugated diene monomer containing from 6 to 12 carbon atoms, such as the elastomers obtained from ethylene or from propylene with an unconjugated diene monomer of the above-mentioned type, in particular, 1,4-hexadiene, ethylidenenorbornene or dicyclopentadiene; or a copolymer of isobutene and of isoprene (butyl rubber or IIR), and also the halogen, in particular chloro or bromo, versions of this type of copolymer.

Particularly preferred diene elastomers are chosen from the group consisting of polybutadienes (BR), polyisoprenes (IR) or natural rubber (NR), styrene-butadiene copolymers (SBR), terpolymers of ethylene, of propylene and of a diene (EPDM), butyl rubber and chloroprene.

In a further embodiment of the invention, one of the faces of the parts to be bonded together by the polyurea adhesive to obtain the above-mentioned article comprises a cross-linked rubber composition, while the other face comprises a ferrous metal or an iron-based metal alloy, such as steel.

According to a still further embodiment of the invention, one of the faces comprises a cross-linked rubber composition, while the other face comprises a synthetic fabric, such as a fabric of bi-elastic knit type to form membranes of configuration containing fibers sold under the registered trademark "LYCRA".

According to a still further aspect of the invention, one of the faces comprises a cross-linked rubber composition, while the other face comprises a rigid plastic, such as a thermosetting polyurethane (for example, application of decoration to tire covers).

Before applying the adhesive according to the invention to one or each of the cross-linked rubber compositions, a chemical or physical modification of the surface of the corresponding composition is carried out, with the aim of making it compatible with the adhesive, so as to improve its adhesiveness and/or its wettability. This surface modification also makes it possible to remove the "contamination" layers or the layers of low cohesion.

Chemical modification of the surface may be carried out according to any one of the following techniques.

The surface of the cross-linked rubber composition may be treated with a solution of trichloroisocyanuric acid in a solvent (abbreviated as TIC, for example 3% in ethyl acetate). Treatment with this solution results in the creation of C—Cl, C—O and COO— linkages at the surface of the cross-linked rubber compositions. It should be noted that TIC can promote the phenomenon of interdiffusion of the macromolecular chains of the adhesive with respect to those of the elastomers of the cross-linked rubber compositions.

Alternatively, a solution of fumaric acid in an organic solvent, or an aqueous solution of sodium dichloroisocyanurate, or alternatively a solution sold by the company Kommerling under the name "Halosol W5", may also be applied to the surface of the composition to be treated. Electrochemical methods may also be used, in order to give the assemblies made using the adhesive according to the invention a great increase in peel force.

Yet another chemical modification technique includes immersing the article to be treated for a period ranging from 2 to 5 minutes in a bath of acidified bleach, based on 25 parts by weight of NaOCl (480 chlorometric) and 10 parts of HCl (d=1.19) per 1000 parts of demineralized water. The article extracted from the bath is then rinsed with mains water, after which it is oven-dried at 60° C.

A physical modification of the surface state may be carried out, for example, according to techniques using plasmas (excited gases emitting light radiation, in particular in the ultraviolet range), most particularly the "Corona discharge" technique, by luminescent discharges, or alternatively using a plasma at atmospheric pressure.

These techniques make it possible to create polar groups (of carbonyl, carboxyl or hydroxyl type, for example) at the surface of the cross-linked rubber compositions, and do so independently of the nature of the gas used (plasmas based on oxygen or ammonia, in particular).

The invention is further illustrated by the following examples, which are to be regarded only as illustrations and not delimitative of the invention in any way.

EXAMPLE 1

This example illustrates the surprising increase in bonding strength with the polyurea adhesive formed using carboxylic acid as a reactant.

Four polyurea adhesives, A1-A4, were produced using the reactant components shown in Table 1. The two-part adhesives were produced by mixing the Part A components with the Part B components. These adhesives were then used to bond two pieces of elastomer together and the resulting bonding strength was measured.

TABLE 1

Polyurea Adhesive Reactant Components

| Reactant Component | Description | MW | OH Index | NCO (%) | Adhesive Makeup (wt. parts) | | | |
|---|---|---|---|---|---|---|---|---|
| | | | | | A1 | A2 | A3 | A4 |
| Side A | | | | | | | | |
| VERSALINK P1000 | Polyamine | 1200 | 93 NH$_2$ | | 50 | 60 | 60 | 55 |
| ANCAMINE K54 | Catalyst | 265 | | | 0.02 | 0.02 | 0.02 | 0.02 |
| ETHACURE 300 | Chain Extender | 214 | 523 NH$_2$ | | 50 | 20 | 20 | 20 |
| SYLVATAL D40LR | Carboxylic Acid | 309 | 181 COOH | | | 20 | 20 | 25 |
| Side B | | | | | | | | |
| TOLONATE HDTLV | Polyisocyanate | 549 | | 23 | 201 | 128 | 115 | 131 |
| | NCO/"OH" (molar ratio) | | | | 2.0 | 2.0 | 1.8 | 2.0 |

VERSALINK P1000 is a product available from Air Products and is the oligomeric diamine polytetramethyleneoxide-di-p-aminobenzoate. ANCAMINE K54 is also available from Air Products and is the trimerization catalyst tris(dimethylaminomethyl)phenol. ETHACURE 300 is a short-chained aromatic amine chain extender available from the Albemarle Corporation. This product is the aromatic diamine 3,5-dimethylthio-2,4-(and 2,6) toluenediamine (DMTDA). SYLVATAL D40LR is a distilled tall oil available from Arizona Chemical and comprises about 40% rosin acids and about 60% fatty acids. TOLONATE HDTLV is available from Rhodia. This product is an HDI trimer, which is an aliphatic polyisocyanate based on hexamethylene diisocyanate (HDI homopolymer), also called HDI isocyanurates.

The elastomeric test specimens, R1 and R2, were made up of the following materials: R1 was made from natural rubber (NR) blended with cis-polybutadiene rubber (BR) and R2 was made from isoprene isobutylene rubber (IIBR). The specimens were made by calendering the materials to a thickness of 2 mm. The smooth sheets were then cut into 15×15 cm pieces and cured. The faces of the specimens were kept smooth to ensure that the bonding with the adhesives could only be chemical and not physical. Just prior to bonding with the adhesives, the test specimens were surface cleaned with 1,1,1 trichloroethane.

The surfaces were then treated by applying trichloroisocyanuric acid (TIC) 3% weight in ethyl acetate, using a brush. The test specimens were allowed to rest for 15 minutes at ambient temperature and then rinsed with ethyl acetate.

After mixing Part A and Part B of the adhesives, an amount of adhesive was spread on each test specimen. The depth of the adhesive, applied with a spatula, ranged between 50 and 200 μm. The R1 and R2 sheets were then pressed one to the other at ambient temperature at a pressure of about 0.15 bar for 4 hours. While the maturation time should be at least 48 hours at ambient temperature, the samples were allowed to mature for 1 week.

Test specimens 150×15 mm were cut from the bonded sheets and were then subjected to tensions of 100 mm/min using an INSTRON machine/4501 model 632 series. The peel force in Newtons was measured for each of the test specimens at a temperature of 23° C. and humidity of 55%. The results are provided in Table 2.

TABLE 2

Peel Test Results

| Adhesive | Pot Life (minutes) | Peel Test (Newtons) |
|---|---|---|
| A1 | 20 | 107 |
| A2 | 2 | 111 |
| A3 | 2 | 111 |
| A4 | 2 | 122 |

As demonstrated by the results shown in Table 2, there was a surprising increase in the bond strength of the adhesives made with the carboxylic acid reactant (A2-A4) than the adhesive without the carboxylic acid reactant (A1). It should be noted that in each case, the failure was at the substrate, with cohesive failure of the R1 and R2 rubber (mainly R2).

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention.

It should be understood from the foregoing description that various modifications and changes may be made in the preferred embodiments of the present invention without departing from its true spirit. The foregoing description is provided for the purpose of illustration only and should not be construed in a limiting sense. Only the language of the following claims should limit the scope of this invention.

What is claimed is:

1. A polyurea adhesive composition obtainable by reaction of reaction components, the reaction components comprising:
   a polyisocyanate comprising isocyanurate rings, the polyisocyanate having a functionality equal to or greater than 3;
   a polyamine having an average molecular weight greater than about 500 Dalton;
   a carboxylic acid; and
   an aromatic diamine chain extender, wherein the molar ratio of isocyanate groups to whole amine and carboxylic acid functions is between 1.5 and 3.5.

2. The polyurea adhesive of claim 1, wherein the polyisocyanate is a trimer derived from hexamethylene diisocyanate having functionality equal to 3.

3. The polyurea adhesive of claim 1, wherein the carboxylic acid is selected from fatty acids, rosin acids or mixtures thereof 4. The polyurea adhesive of claim 1, wherein the carboxylic acid is a distilled tall oil.

5. The polyurea adhesive of claim 4, wherein the tall oil comprises oleic acid, linoleic acid, abietic acid and dehydroabietic acid.

6. The polyurea adhesive of claim 1, wherein the polyamine has an average molecular weight greater than about 950 Dalton.

7. The polyurea adhesive of claim 1, wherein the polyamine is an oligomeric diamine.

8. The polyurea adhesive of claim 7, wherein the polyamine is a polyester diamine.

9. The polyurea adhesive of claim 8, wherein the polyamine is a polyoxypropylene diamine, a polyoxyethylene diamine, a polyoxytetramethylene diamine or mixtures thereof.

10. The polyurea adhesive of claim 1, further comprising:
    a trimerization catalyst capable of forming isocyanurate groups from isocyanate groups.

11. A process, comprising:
    reacting the following reaction components in mass fraction relative to the total mass of reactants to form a polyurea adhesive:
    between 40 and 70% of a polyisocyanate comprising isocyanurate rings, the polyisocyanate having a functionality equal to or greater than 3;
    between 10 and 40% of a polyamine having an average molecular weight greater than about 500 dalton;
    between 5 and 25% of a carboxylic acid; and
    between 0 and 20% of an aromatic diamine chain extender.

12. The process of claim 11, further comprising:
    applying the polyurea adhesive to a face of a cross-linked rubber article;

bonding the face of the cross-linked rubber article to a substrate.

13. The process of claim 12, wherein the substrate is made of a cross-linked rubber article.

14. The process of claim 12, wherein the cross-linked rubber article is a patch and the substrate is a tire.

15. An article, comprising:
a component bonded to the article with the adhesive of claim 1.

16. The article of claim 15, wherein bonded faces between the component and the article are of cross-linked rubber composition.

17. The article of claim 16, wherein the article is a tire.

18. The article of claim 16, wherein the component is a tread band.

19. The article of claim 16, wherein the component is a patch.

20. The article of claim 16, wherein at least one of the bonded faces between the component and the article are of cross-linked rubber composition.

21. The article of claim 20, wherein a face of the component comprises a synthetic fabric, a thermosetting polymer, a ferrous metal, an iron-based metal alloy or combinations thereof 22. The article of claim 20, wherein a face of the article comprises a synthetic fabric, a thermosetting polymer, a ferrous metal, an iron-based metal alloy or combinations thereof.

* * * * *